US007823617B2

(12) United States Patent
Smythe et al.

(10) Patent No.: US 7,823,617 B2
(45) Date of Patent: Nov. 2, 2010

(54) SPRING POWERED SLIDING DRYWALL TAPING TOOL WITH AUTO CUTTER

(75) Inventors: Timothy Smythe, Bend, OR (US); Douglas Wambaugh, Bend, OR (US)

(73) Assignee: Timothy Smythe, Jr., Bend, OR (US)

( * ) Notice: Subject to any disclaimer, the term of this patent is extended or adjusted under 35 U.S.C. 154(b) by 1005 days.

(21) Appl. No.: 11/385,025

(22) Filed: Mar. 20, 2006

(65) Prior Publication Data

US 2006/0219366 A1 Oct. 5, 2006

Related U.S. Application Data

(60) Provisional application No. 60/664,282, filed on Mar. 22, 2005.

(51) Int. Cl.
*B32B 37/12* (2006.01)

(52) U.S. Cl. ....................... 156/526; 156/577; 156/578; 156/579

(58) Field of Classification Search ................. 156/574, 156/575, 577, 578, 579
See application file for complete search history.

(56) References Cited

U.S. PATENT DOCUMENTS

| | | | | | |
|---|---|---|---|---|---|
| 3,960,643 | A | * | 6/1976 | Dargitz et al. | 156/390 |
| 4,086,121 | A | * | 4/1978 | Ames | 156/526 |
| 4,555,298 | A | * | 11/1985 | Boucher | 156/523 |
| 5,476,571 | A | * | 12/1995 | Diaz | 156/577 |
| 6,513,562 | B1 | * | 2/2003 | Trout | 156/391 |
| 2002/0020482 | A1 | * | 2/2002 | O'Mara et al. | 156/71 |
| 2004/0124235 | A1 | * | 7/2004 | White et al. | 229/125.34 |
| 2004/0159406 | A1 | * | 8/2004 | Jungklaus | 156/577 |
| 2005/0193511 | A1 | * | 9/2005 | St. James et al. | 15/144.4 |
| 2007/0044923 | A1 | * | 3/2007 | Jungklaus et al. | 156/575 |
| 2007/0215289 | A1 | * | 9/2007 | Kennedy | 156/577 |

* cited by examiner

*Primary Examiner*—Mark A Osele
(74) *Attorney, Agent, or Firm*—Clifford Kraft

(57) ABSTRACT

A drywall tape or trim dispensing tool of the type similar to those sold under the name BAZOOKA with an elongated handle and a tape or trim dispensing head. The head can contain a blade coupled to a power mechanism such as a spring, hydraulic or electric energy source where the blade can be placed into a cocked position by a cocking mechanism and then triggered by a pull on a remote trigger located on the handle. After the device is cocked, the user can dispense tape or trim to a desired length and then cut it exactly by a simple trigger pull.

5 Claims, 7 Drawing Sheets

SCALE 1 : 6

SECTION C-C
SCALE 1 : 2

DETAIL F
SCALE 2 : 1

SCALE 1 : 6

SECTION C-C
SCALE 1 : 2

SCALE 1 : 6

SECTION C-C
SCALE 1 : 2

DETAIL F
SCALE 2 : 1

SCALE 1 : 6

SECTION C-C
SCALE 1 : 2

DETAIL F
SCALE 2 : 1

SPRING POWERED SLIDING DRYWALL TAPING TOOL WITH AUTO CUTTER

This application is related to and claims priority from U.S. provisional application No. 60/664,282 filed Mar. 22, 2005. Application Ser. No. 60/664,282 is hereby incorporated by reference.

BACKGROUND

1. Field of the Invention

The present invention relates to drywall taping tools and more particularly to a drywall taping tool with a powered cutter.

2. Description of the Prior Art

There are many automatic drywall taping devices in production today that are commonly called BAZOOKAs (BAZOOKA is a registered trademark). Normally tools of this type have a tape (or paper) cutter incorporated into the design. This cutter is usually activated by pulling a movable tube down against a spring. This requires a movement of the arm while holding the bazooka. This can be very difficult in tight spots, at odd angles or when reaching high up joints.

It would be advantageous to have a drywall taping tool that converted this same type of cutting mechanism into a powered, trigger activated, auto cutter.

Several drawings and illustrations have been presented to aid in the understanding of the invention. The scope of the present invention is not limited to the figures.

SUMMARY OF THE INVENTION

The present invention relates to a drywall taping tool that includes a standard drywall taping tool such as a BAZOOKA tool with an elongated handle, a tape cutter mounted on a distal end of the taping tool, wherein drywall tape passes through the tape cutter, and a trigger mounted on said elongated handle where the trigger causes the tape cutter to cut said drywall tape. The drywall taping tool of can be spring powered, hydraulic powered, electric powered or otherwise powered.

DESCRIPTION OF THE INVENTION

The present invention relates to a drywall tape dispensing tool with a powered auto cutter. This auto cutter uses the stored energy of a spring to do the cutting once the operator has depressed a trigger, normally with one finger. No arm motion is normally required to make the cut. This allows the operator to keep the tool precisely positioned at any angle, height, especially in tight spaces. The auto cutter can be cocked (ready for the next cut) while moving from one joint to the next joint.

The present invention is not limited to a spring powered cutter, rather the cutter may be powered by any means such as pneumatic, hydraulic, electrical, or any other power source.

Figure 1:
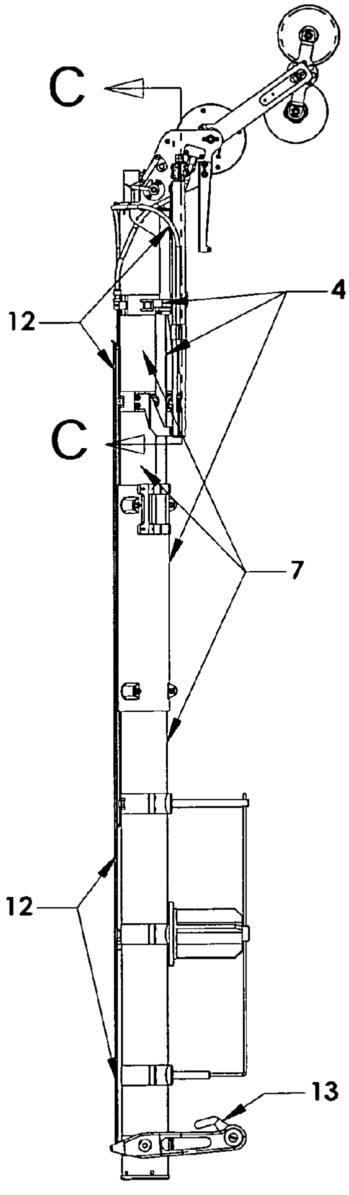
FIG. 1 shows a side view of the tool in the idle position.

Turning to FIG. 1 a side view of a taping tool is seen. This view shows a side view of the entire tool in the Idle position (not cocked, piston & pin assembly is up). On this view you can see where section C-C is located for the creation of FIG. 2.

Figure 2:
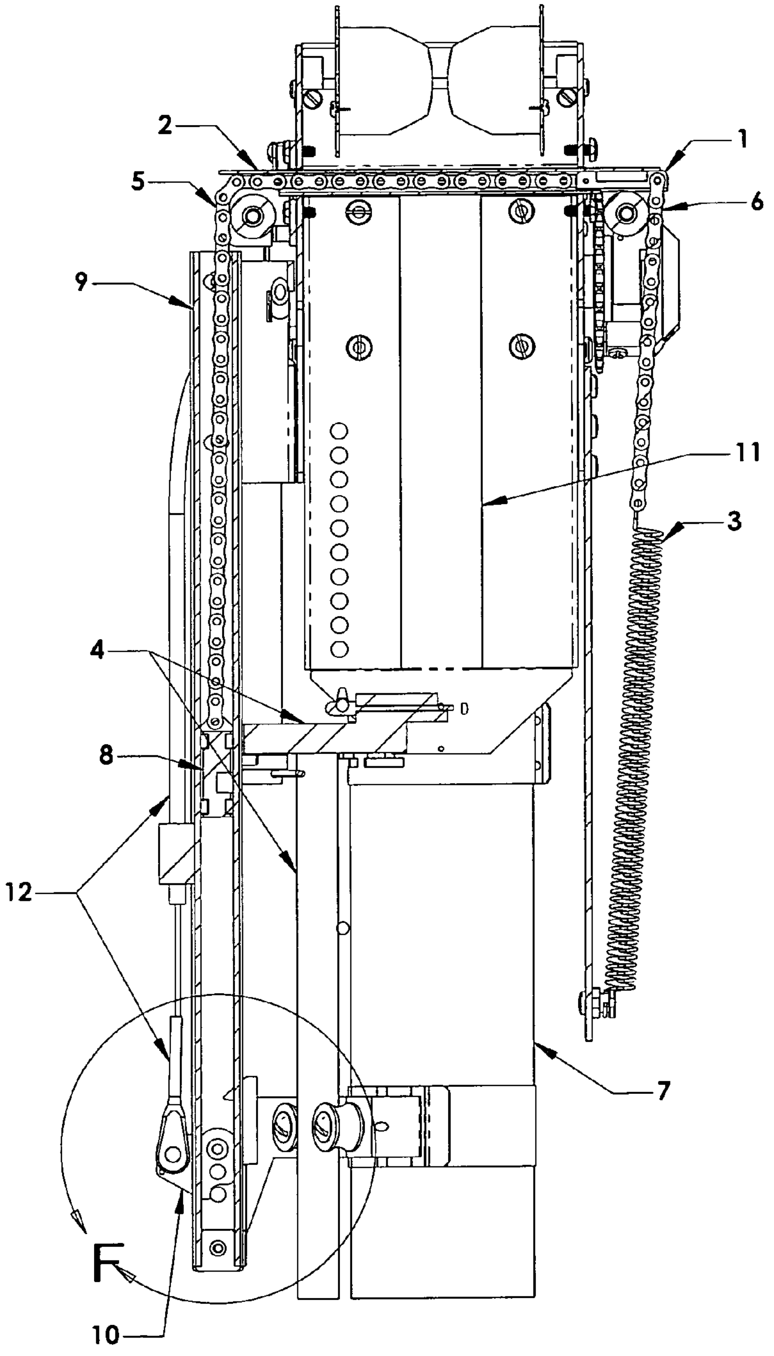
FIG. 2 shows a Section C-C from FIG. 1.

FIG. 2 shows section C-C as derived from FIG. 1. Section C-C shows mainly the pertinent parts and assembly(s) needed for an understanding of the present invention. The tool is shown in the idle position.

Figure 3:
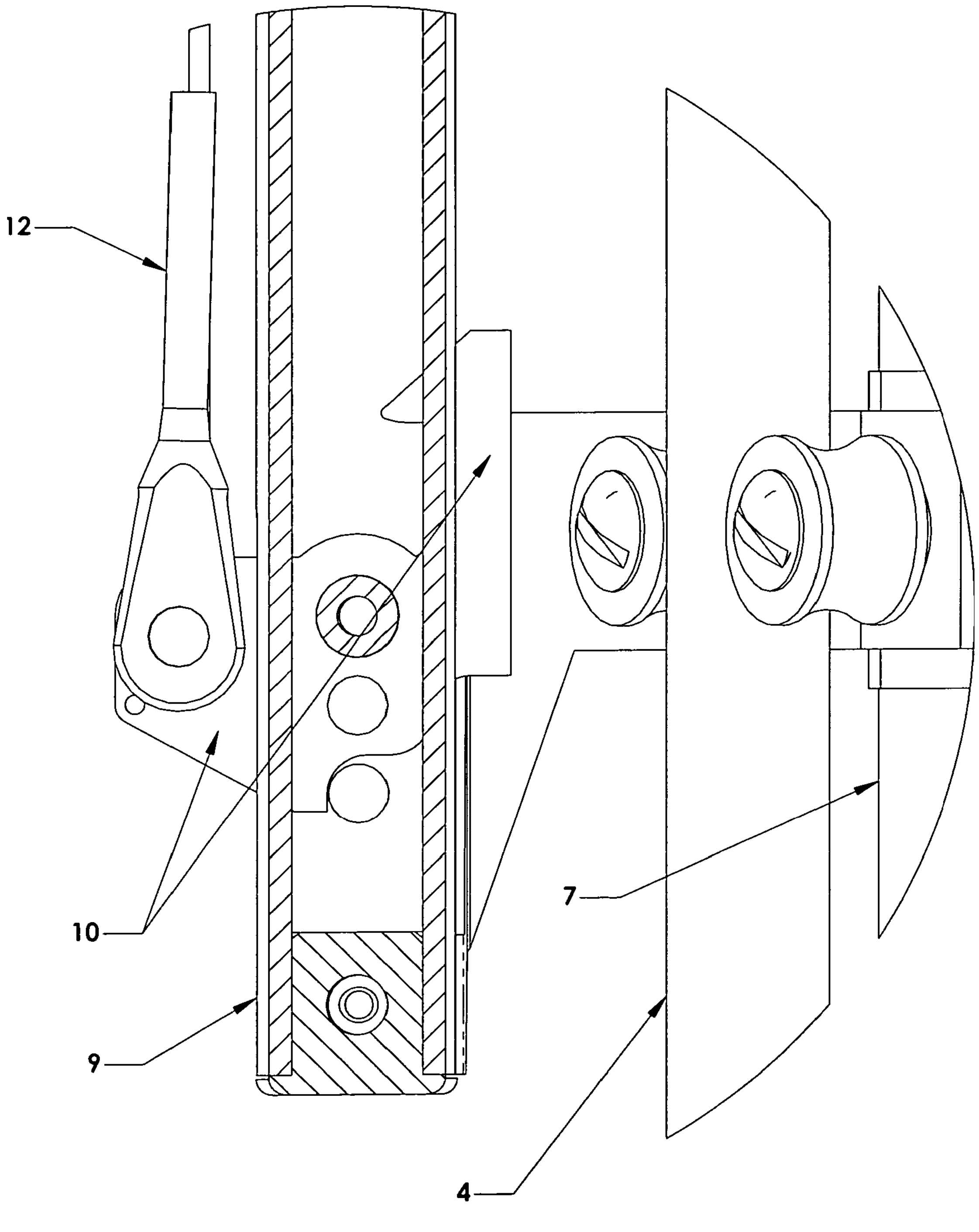
FIG. 3 shows Detail F from FIG. 1.

FIG. 3 shows Detail F as derived from FIG. 2. Detail F shows the latch 10 and triggering cable 12 in the idle position.

Figure 4:
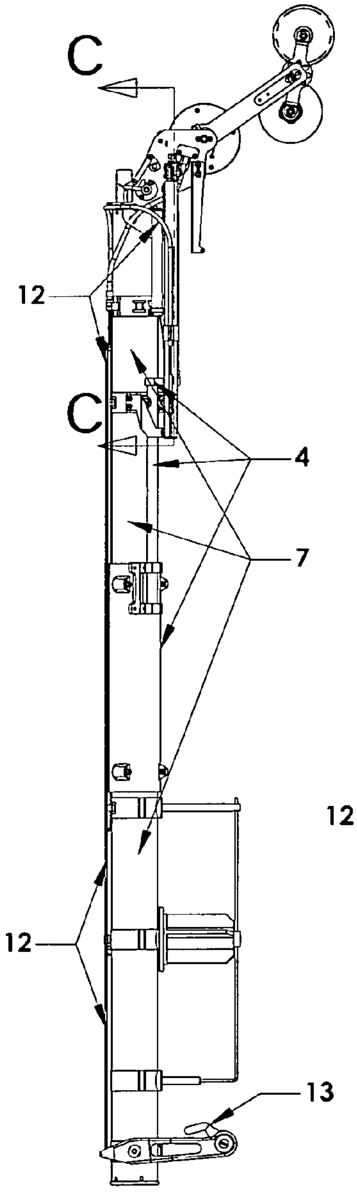
FIG. 4 shows the tool in the cocking position.

FIG. 4 shows a side view of the entire tool in the Cocking position as will be described.

Figure 5:
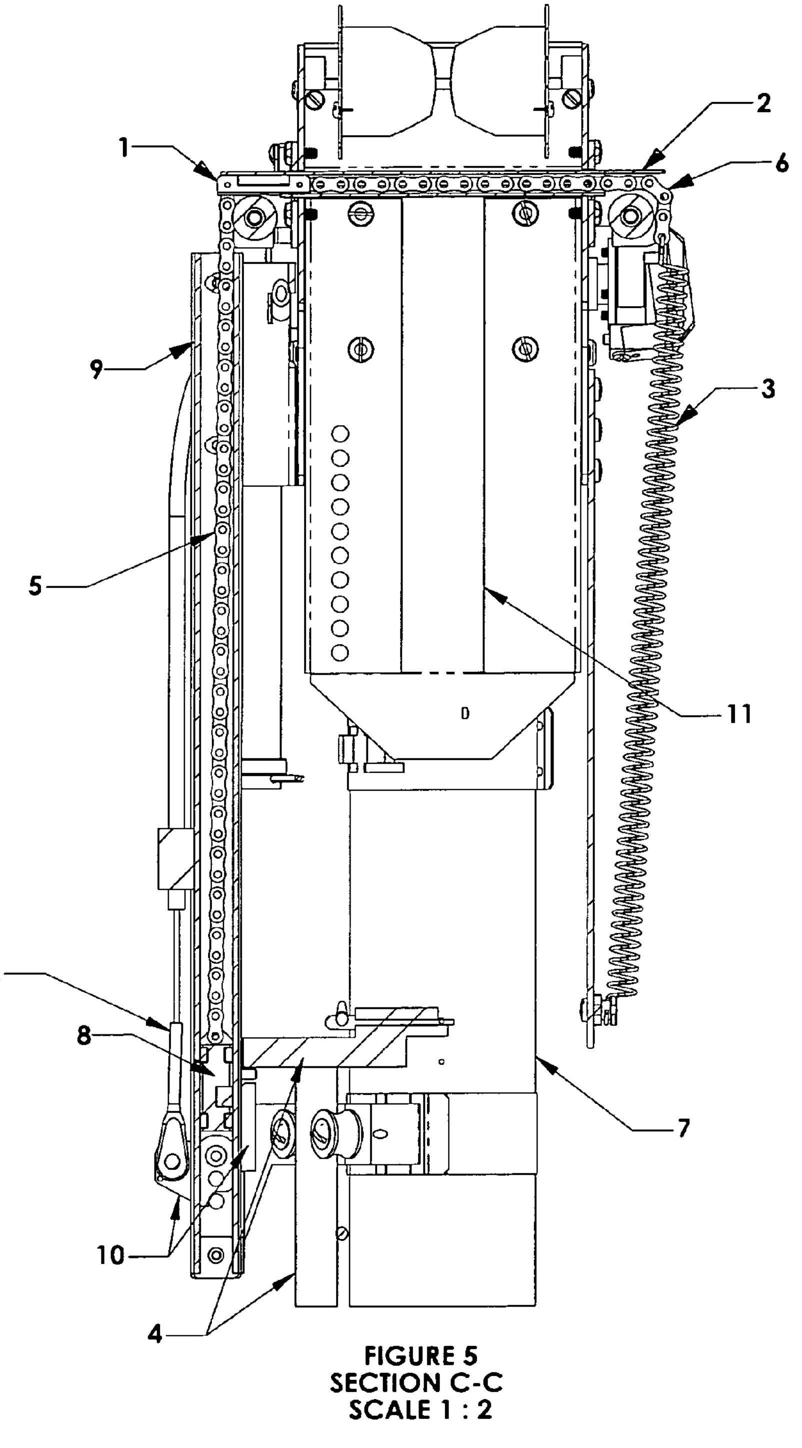
FIG. 5 shows Section C-C from FIG. 4.

FIG. 5 shows section C-C again, as derived from FIG. 4 while the tool is in the Cocking position. In FIG. 5 can be seen more clearly that the slider assembly 4 has been pulled down. Doing this pulls down the piston & pin assemble 8 until it is captured by the latch 10. During this motion the piston & pin assembly 8 pulls the piston chain 5 which pulls the blade carrier 1 to the left end of the blade guide 2. The movement of the blade carrier 1 pulls the spring chain 6 which pulls on the spring 3, extending it.

Figure 6:
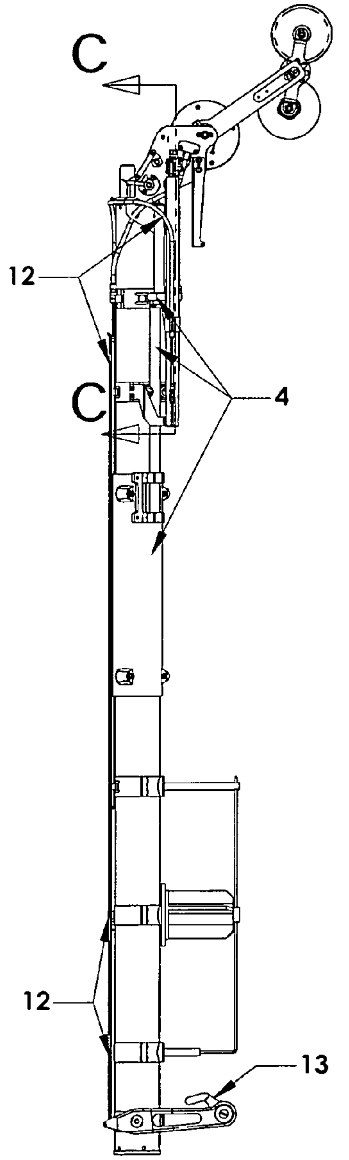
FIG. 6 shows the tool in the cocked and ready position.

FIG. 6 shows a side view of the entire tool in the cocked & ready position as will be described.

FIG. 7 shows section C-C again, as derived from FIG. 6, while the tool is in the cocked & ready position. That means the sliding tube 4 has been raised leaving the piston & pin assembly 8 captured by the latch 10 and ready to be triggered. In this position the tool is ready to cut. A cut is initiated by pushing down on the trigger 13. This pulls a the trigger cable 12 which runs the length of the tool body 7 and pulls up on the latch 10.

Figure 7:
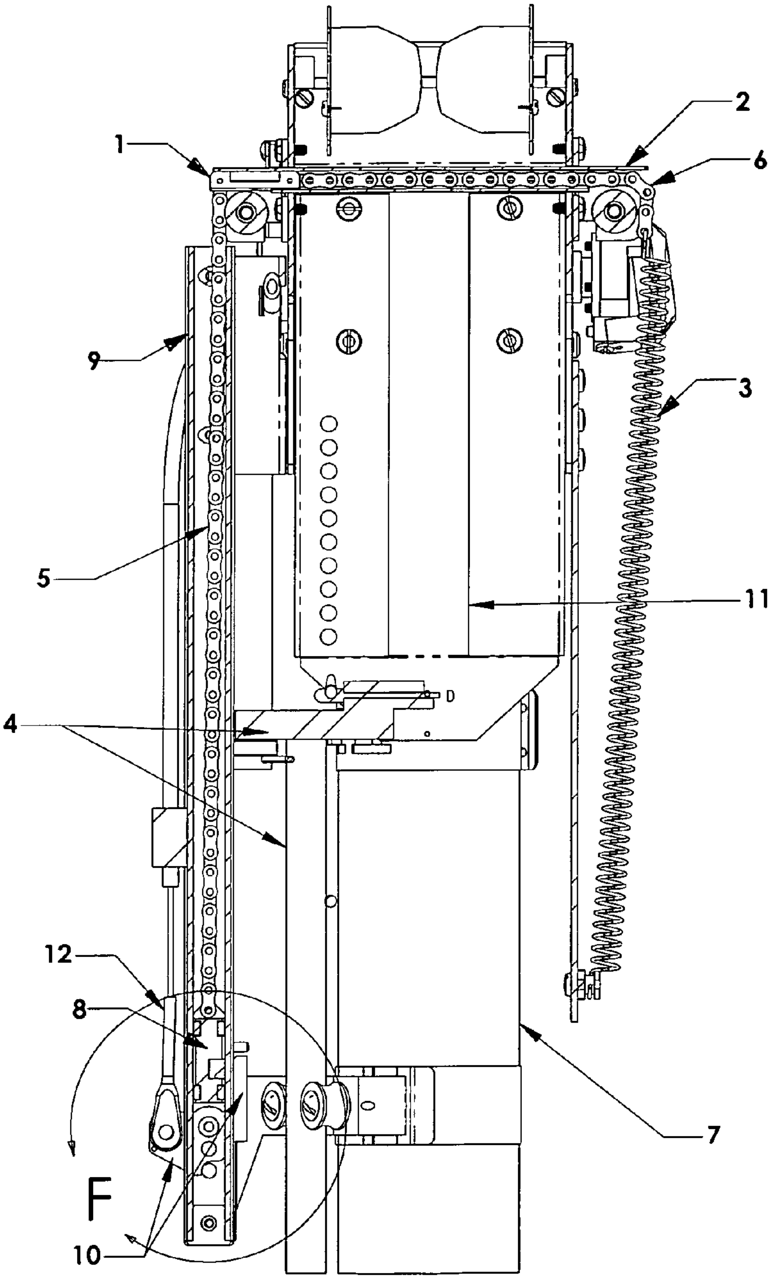
FIG. 7 shows Section C-C from FIG. 6.
Figure 8:
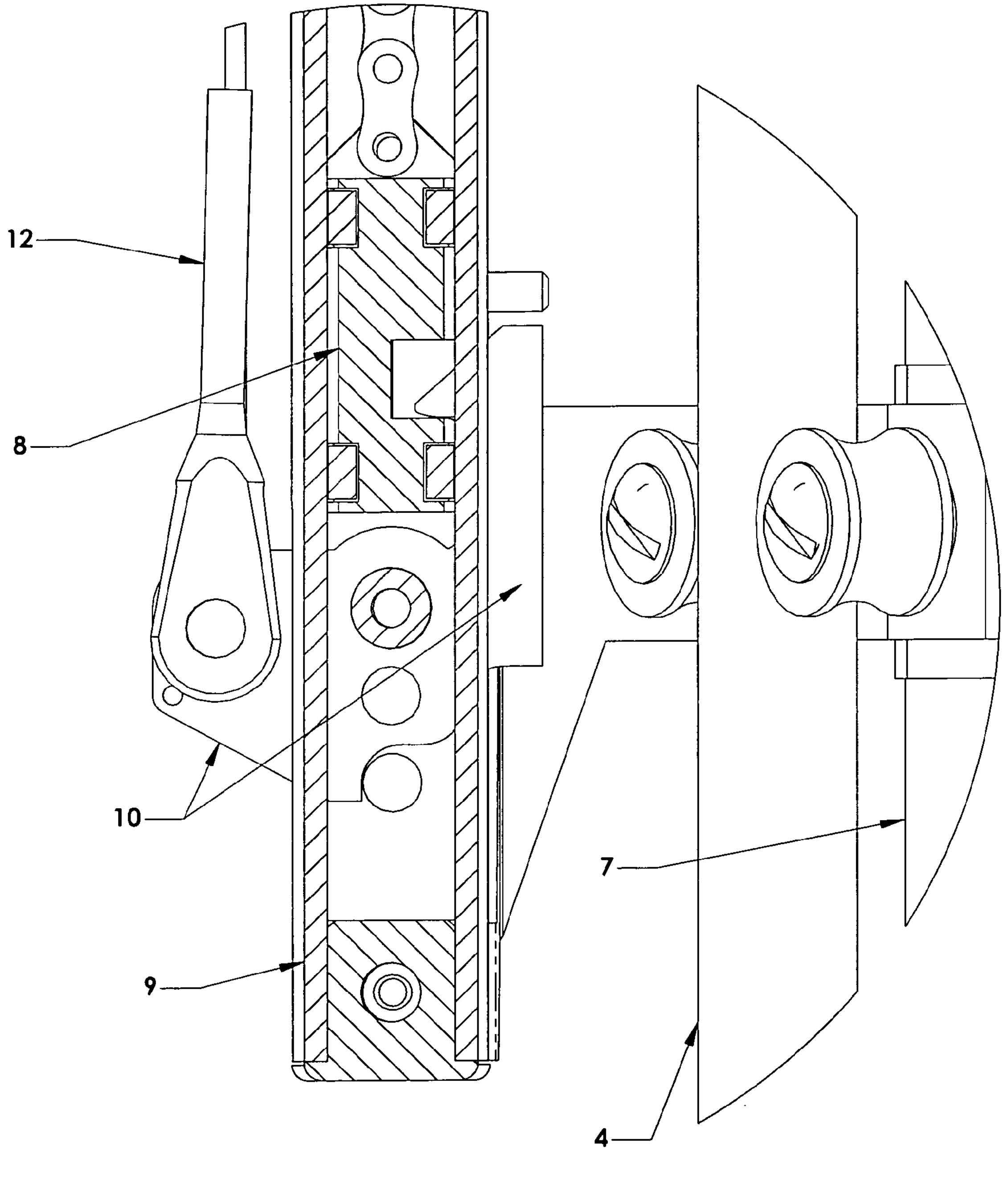
FIG. 8 shows Detail F. from FIG. 6.

FIG. 8 shows Detail F, as derived from FIG. 7, which is a detail view of the latch 10, trigger cable 12, piston & pin assembly 8 and the slider assembly 4, in the cocked & ready position.

Figure 9:
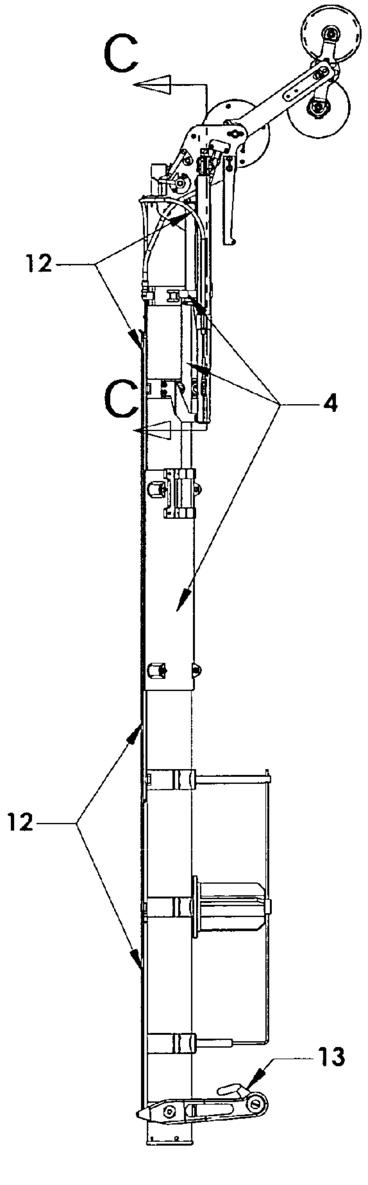
FIG. 9 shows the tool in the triggered and cut position.

FIG. 9 shows a side view of the entire tool in the Triggered & Cut position as will be described.

Figure 10:
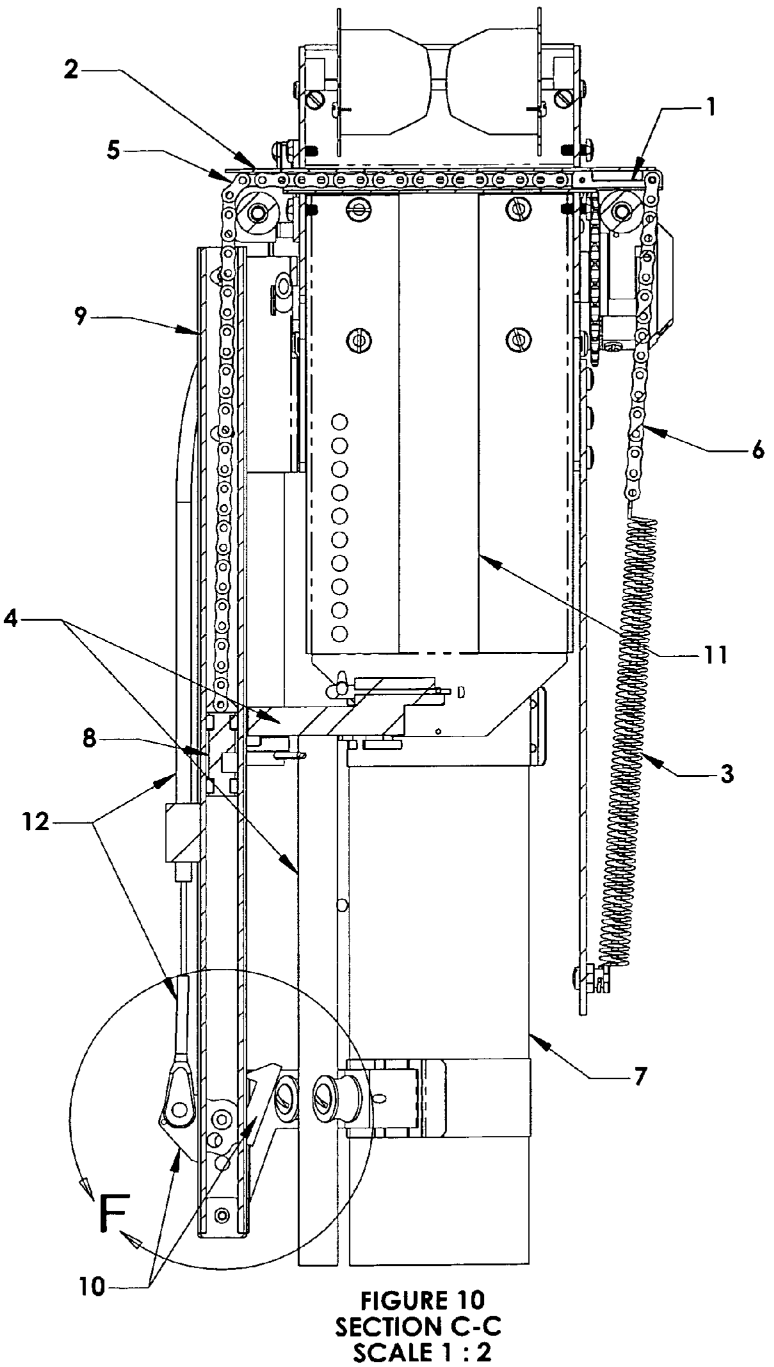
FIG. 10 shows Section C-C from FIG. 9.

FIG. 10 shows section C-C as derived from FIG. 9, in the Triggered & Cut position. In the Triggered & Cut position the catch has been rotated away from the cylinder & pin assembly by pulling on the trigger cable 12 which is routed down the tool main body 7 to the trigger 13. Once the trigger 13 is depressed, the trigger cable 12 is pulled which pulls on the catch 10 rotating it away from the cylinder & pin assembly 8. This rotation of the catch 10 releases the cylinder & pin assembly 8. The spring 3 tension pulls spring chain 6 which pulls the blade carrier 1 to the right side of the blade guide 2 instantly pulling the blade across the path of the taping product which is held in place by the product guide 11. The taping product is cut instantly by depressing the remote trigger. During this motion the blade carrier 1 pulls the actuation chain 5 which pulls the cylinder & pin assembly 8 up. The system ends up in the idle position.

Figure 11:
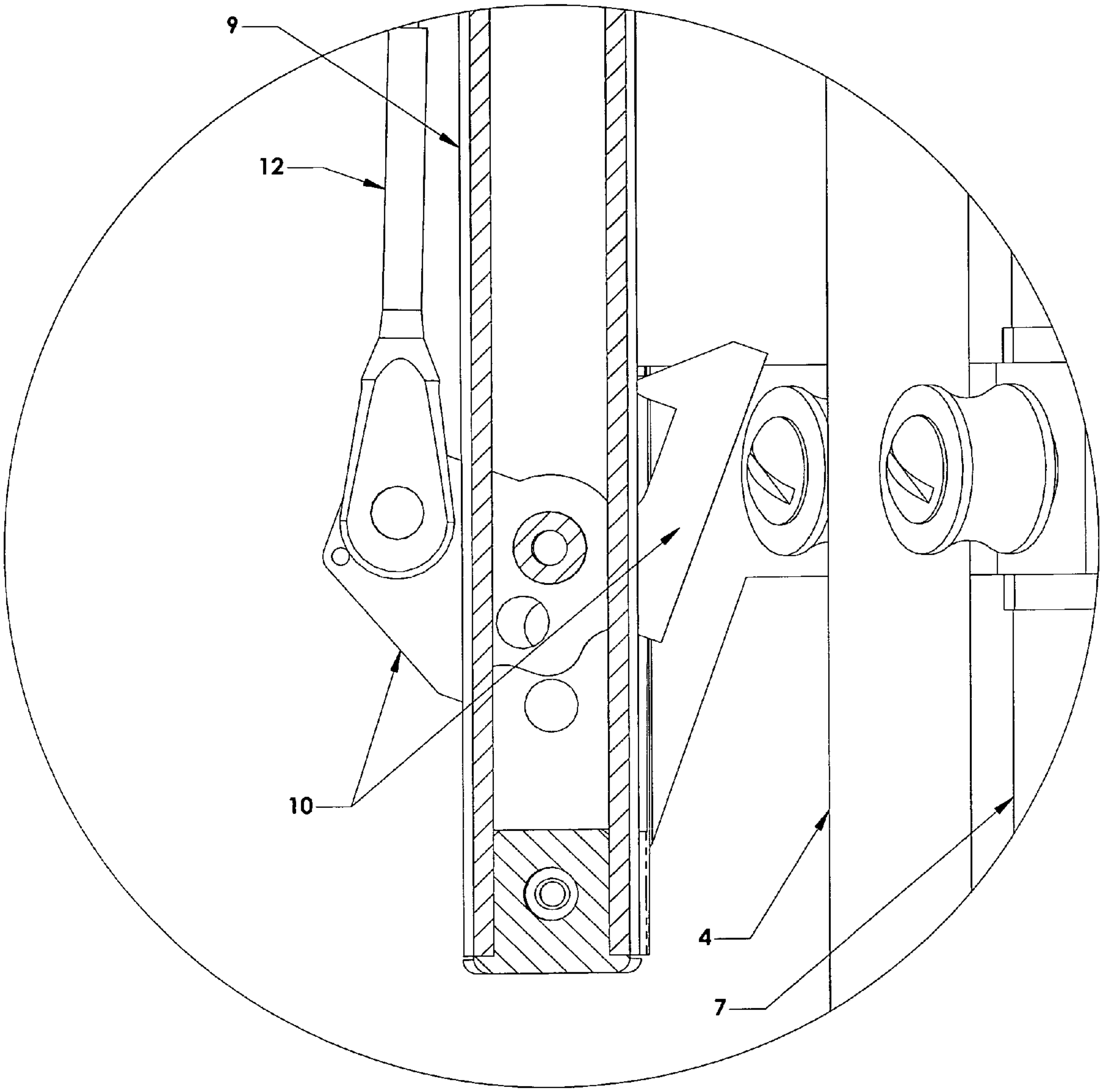
FIG. 11 shows Detail F. from FIG. 9.

FIG. 11 shows Detail F as derived from FIG. 10, which is a detail view of the latch 10, trigger cable 12 and the slider assembly in the Triggered & Cut position.

Operation

In the prior art device, the blade carrier 1 which holds the cutting blade and slides through a blade guide 2 which spans the width of the tool and across the path, and up against the taping product which is held in this position by a product guide 11. A chain is attached to each end of the carriage 1 which is used to pull the blade carriage 1 from one end of the guide 2 to the other end cutting the taping material as it moves. Attached to one side of the carriage 1 is a spring chain 6 that leads around a pulley 14 to a spring 3 which is anchored to the main tool body 7. On the other side of the carriage an actuation chain 5 is attached which leads around another pulley 15 to a sliding tube assembly 4 that the operator holds onto during operation. The sliding tube assembly 4 is concentric with the main tool tube 7 and has rollers allowing it to be freely moved up and down a portion of the main tool tube 7. With the chain attached to this sliding tube assembly 4 the operator can pull the actuation chain 5, which pulls the blade carriage 1 through the guide 2 which pulls the spring chain 6 stretching the spring 3 at the other end of the chain. The blade carriage 1 slides through the blade guide 2, across the path of the taping product which is held in place, next to the blade guide 2, by the product guide 11, cutting the taping product. This is done against the resistance of the stretching spring 3 which is anchored to the main tool body 7. When the operator releases the sliding tube assembly 4 the spring 3 pulls the assembly back to its original position.

The present invention incorporates a latch and trigger mechanism into the prior art taping tool mechanism. An actuation chain 5 is attached to a piston & pin assembly 8. The piston and pin assembly slides freely inside a cylinder 9 with the pin of the cylinder & pin assembly 8 running in a slot on the side of the cylinder 9. The movable tube 4 is adapted to hit the piston & pin assembly 8 on the pin. When the movable tube 4 is pulled down (the same motion currently made when cutting with prior art taping tools) it hits the piston & pin assembly 8 causing it to slide down the cylinder 9. This pulls the actuation chain 5, which moves the blade carriage 1 along the guide 2, which pulls the spring chain 6, stretching the spring 3. When the movable tube 4 is pulled far enough down the piston & pin assembly 8 engages the catch 10 until the catch 10 drops into a step in the side of the piston & pin assembly 8. This captures the piston & pin assembly 8.

The sliding tube assembly 4 is then raised back up to it's original position beyond vertical travel of the piston & pin assembly 8. The tool is now cocked and ready to cut. The operator uses the bazooka as he normally would to apply joint compound and tape to the joint. At the end of the joint the operator depresses the trigger lever 13 which pulls the trigger cable 12. The other end of the trigger cable is attached to the latch 10 and when the trigger cable 12 is pulled it rotates the latch 10 until it releases the cylinder & pin assembly 8. Once the cylinder & pin assemble 8 is free, the spring 3 which has been pulling on the system pulls the blade carrier 1 along the blade guide 2 across the path of the taping material. This happens instantaneously. The tool can then be cocked again and is ready for the next joint.

Several descriptions and illustrations have been presented to aid in understanding the present invention. One skilled in the art will realize that many changes and variations can be made without departing from the spirit of the invention. Each of these changes and variations is within the scope of the present invention.

We claim:

1. A drywall tape or trim applicator and cutter system comprising:

an elongated support structure having a first and second end, said support structure including a dispensing head on the first end receiving and dispensing drywall trim material, wherein said dispensing head contains:

a blade guide running laterally from side to side;

a actuator chain running parallel to the blade guide;

a blade attached to the actuator chain, said blade moving laterally with said actuator chain along said blade guide;

wherein, said actuator chain extends around a first pulley into said elongated support structure and is attached to a cocking mechanism located near the second end and wherein, said actuator chain extends around a second pulley and is attached to a power spring or actuator;

wherein, said cocking mechanism includes a piston and pin assembly slideable inside a cylinder attached to said support structure that can be moved toward said second end to extend said power spring or actuator and cock the system, said cocking system engaging a catch when the system is cocked;

and wherein, said catch is releasable by a cooperating trigger mounted near said second end of the elongated support structure.

2. The drywall tape or trim applicator and cutter system of claim 1 further comprising a movable tube adapted to engage said pin and cock said system.

3. The drywall tape or trim applicator and cutter system of claim 1 wherein said head further contains a trim material guide.

4. The drywall tape or trim applicator and cutter system of claim 1 wherein said actuator is electric.

5. The drywall tape or trim applicator and cutter system of claim 1 wherein said actuator is hydraulic.

* * * * *